United States Patent

Nomura et al.

[11] Patent Number: 5,974,686
[45] Date of Patent: Nov. 2, 1999

[54] METHOD FOR PRESERVING COOKED FOOD USING A VACUUM SEALED PRESERVATION CONTAINER

[75] Inventors: Minoru Nomura; Shigeru Nomura, both of Nagoya, Japan

[73] Assignee: Hikari Kinzoku Industry Co., Ltd., Nagoya, Japan

[21] Appl. No.: 09/056,749

[22] Filed: Apr. 8, 1998

[30] Foreign Application Priority Data

Apr. 16, 1997 [JP] Japan .................................. 9-099347
May 16, 1997 [JP] Japan .................................. 9-127075
Feb. 17, 1998 [JP] Japan .................................. 10-034517

[51] Int. Cl.⁶ ...................................................... F26B 3/34
[52] U.S. Cl. .............................. 34/263; 34/391; 34/417; 219/735
[58] Field of Search ........................... 34/259, 263, 380, 34/381, 391, 417, 90, 92, 201, 202; 99/340, 403, 451, DIG. 14; 426/118, 243; 219/732, 734, 735

[56] References Cited

U.S. PATENT DOCUMENTS

| 4,830,190 | 5/1989 | Inagaki .................... 206/550 |
| 5,405,635 | 4/1995 | Hayashi .................... 426/462 |
| 5,596,921 | 1/1997 | Kuwana et al. ............ 99/340 |
| 5,750,967 | 5/1998 | Sprauer, Jr. .............. 219/735 |

FOREIGN PATENT DOCUMENTS 3-8750  2/1991  Japan .
4-30830 5/1992  Japan .
4-73980 11/1992 Japan .

OTHER PUBLICATIONS

Nishida, Hiroshi, "Practical Food Hygiene for Women," Ohm Co., pp. 250–252, 1990 (with English-language translation).

*Primary Examiner*—Henry Bennett
*Assistant Examiner*—Steve Gravini
*Attorney, Agent, or Firm*—Morgan, Lewis & Bockius LLP

[57] ABSTRACT

A vacuum sealed preservation container comprises a container main body and a lid made of a synthetic resin which is heat resistant and cold resistant and has microwave permeability, in which the lid has on the upper surface thereof a check valve constituted such that gases in the container flow out only in one direction to the outside of the container through a vent hole and a packing mounted in a packing case disposed in contiguous with the circumferential edge thereof, and the container is constituted such that the lid and the container main body are in airtight contact with each other by way of the packing. When cooked foods are filled in the container main body of the container and heated for a predetermined period of time with the lid being covered in a microwave oven, the foods are heated rapidly from the inside to generate steam, and air in the container is expanded and discharged together with the steam to the outside, upon which the foods and the gases are sterilized simultaneously, the container is taken out after completion of heating, sealed by immediately pressing the lid, and the container and the foods are cooled, then high vacuum is attained inside the container to increase the sealing force of the container, so that the foods can be preserved safely.

9 Claims, 4 Drawing Sheets

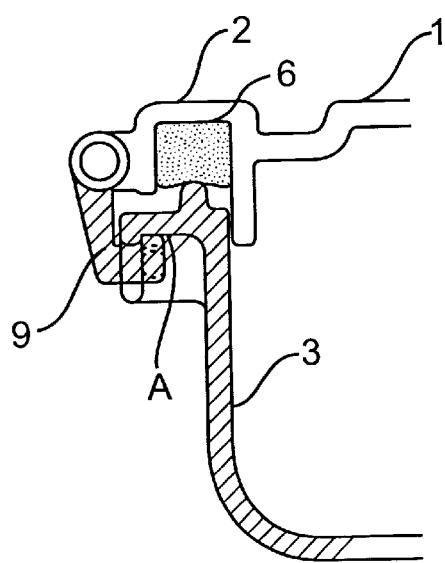
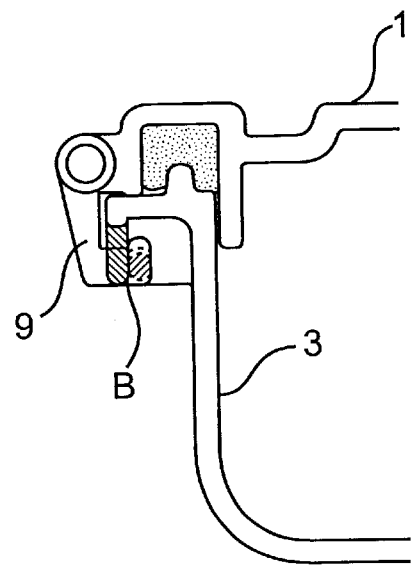
FIG. 3(a) FIG. 3(b)
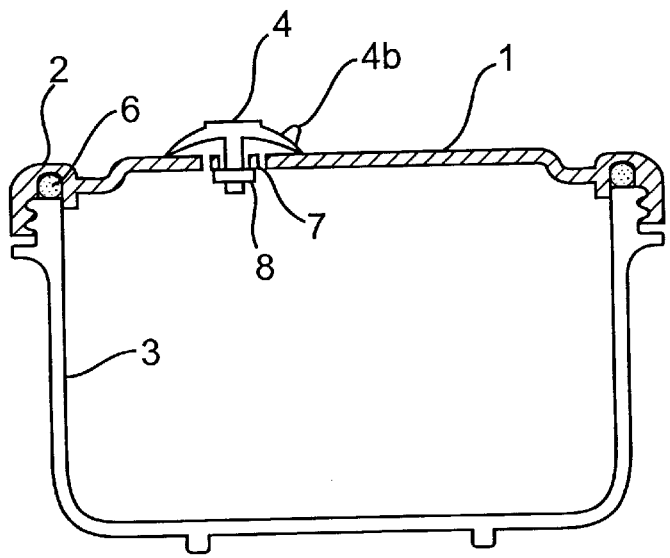
FIG. 4

METHOD FOR PRESERVING COOKED FOOD USING A VACUUM SEALED PRESERVATION CONTAINER

BACKGROUND OF THE INVENTION

1. Field of the Invention

Present invention relates to a method for preserving cooked foods and a vacuum sealed preservation container therefor and, more particularly, it relates to a method for preserving cooked foods and a vacuum sealed preservation container therefor for safely storing perishable foods and cooked foods such as heated-cooked foods cooked by heating, other than perishable foods, for a long period of time.

2. Description of Related Prior Art

Method for preserving heat-cooked foods has been disclosed, for example, in Japanese Patent No. 1649898 (Japanese Patent Publication Hei 3(1991)-8750).

Existent preservation containers include tupperware, tightware, and tightware with pressure control valves.

Tupperware has a lid made of a soft resin, which is a mere container not having any food preserving function since the container has no complete barrier property for external air.

Tightware has a constitution as shown in FIG. 6 and when heat-cooked foods are filled while hot and tightly closed by locking a securing tool, the pressure inside the container is reduced after cooling and a lid cannot be detached any more. Tightware with a pressure control valve is constituted, as shown in FIG. 7, such that a pressure control valve 11 (operating in a manner opposite to a check valve) is provided to a lid. When heat-cooked foods are filled while hot and external air is allowed to enter automatically even after cooling to prevent reduction of pressure in the container thereby making the lid removable. However, this also results in a possibility of invasion of bacteria, which is not preferred in view of food preservation.

Further, upon heating foods in a microwave oven, since stoppers have to be detached before heating in any case, this cannot be applied to the present invention. However, the preservation method as disclosed in Japanese Patent Publication Hei 3-8750 has a feature of filling cooked foods while hot sterilizing by microwave heating in a microwave oven and then preserving them in a tightly sealed state and the method is limited to filling while hot. That is, it is conditioned that foods are packed before cooling. Since heat-cooked foods are in a sterile state from the end of heating to a state cooled to approximately 60° C. and, further, in a substantially sterile state till it is cooled to approximately 40° C., and a worry of secondary contamination, if any, will be little. Therefore, it is apparent that foods can be preserved for a considerable period of time with no petrifaction when they are heat-sterilized in a microwave oven and stored in a tightly sealed state, and this method is used for single kinds of foods.

When the container is actually used, for example, as a lunch box, not only single kind of foods but also two or three kinds of heat-cooked foods, or those foods having difference in the time elapsed after the heat cooking are often packed in combination into the container. Further, if green vegetables as non-heated foods having high risk of contamination are contained as a portion thereof, it may prevail contamination to other heat-cooked foods.

Further, those foods such as hamburgers made from materials such as minced meat of low heat conductivity cannot be heated sufficiently to a central portion, so that pathogenic *Escherichia coli*. O157 may some time remain.

With another view point, food poisoning, food accident, etc. are often caused actually due to occurrence of secondary contamination by leaving foods at an ambient temperature after heat-cooking, particularly, depending on the duration of time of leaving in the summer season, inadequacy for the control of the state where the foods are left, and also caused from the container.

Further, in a state where bacteria present in the initial stage are killed by the heat cooking, since newly attached contaminating bacteria grow extremely rapidly, this may cause food poisoning or the like ("Practical Food Hygiene for Women", written by Hiroshi Nishida Published from Ohm Co. p 250–252, issued 1990).

Particularly, when the container is taken out in a normal temperature circumstance as a lunch box particularly in the summer season, it has to be exposed in a severe condition of 30° C. to 35° C. for at least 6 to 10 hours inevitably.

SUMMARY OF THE INVENTION

The present invention has been made in view of the above circumferences and has an object to overcome the above problems and to provide a method for preserving cooked foods and a vacuum sealed preservation container capable of preserving foods such as perishable foods, several kinds of foods after heat cooking, and those foods having difference in the time elapsed after the heat-cooking when packed in combination in a container, safely without causing food accidents even if a portion thereof should suffer from secondary contamination by bacteria.

Another object of the present invention is to provide a method for preserving cooked foods and a vacuum sealed preservation container therefor, capable of preserving cooked foods for a considerable period of time without deteriorating tastes.

A further object of the present invention is to provide a vacuum sealed preservation container capable of safely heating as it is sealed in a microwave oven when served by re-heating and capable of being heated in a short period of time.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the present invention, as embodied and broadly described herein, a method for preserving cooked foods comprises a filling step for filling cooked foods in a preservation container, a covering step for covering a lid having a check valve enabling to discharge gases in the preservation container over the preservation container filled with the cooked foods in the filling step, a heating step for heating by microwaves the cooked foods in the preservation container covered with the lid by the covering step, a sealing step for discharging air in the preservation container for the cooked foods heated by the heating step by way of the check valve thereby sealing under a reduced pressure the inside of the preservation container, and a cooling step for cooling the cooked foods in the preservation container sealed under a reduced pressure by the sealing step.

Another aspect of the present invention, a method for preserving cooked foods comprises a step for filling cooked foods in a container main body of a vacuum preservation container having a container main body and a lid disposed on the upper surface thereof and having a check valve, in which packing is mounted in a packing =case disposed in contiguous with the circumferential edge of the lid, a step for heating foods for a predetermined period of time with the lid being covered in a microwave oven, thereby rapidly heating the foods from the inside and sterilizing them and, at the same time, rapidly discharging water contents of the foods, steam generated from a cooking water content, and air in a gap in the upper portion of the container which is heated and expanded to the outside, through a portion between the lid and the container main body and through a vent hole below the check valve, a step for rapidly taking out the container immediately after the completion of the heating by an electronic microwave oven and then sealing the same, and a step for further increasing the sealing force of the container by cooling the container and the foods contained thereby rendering the inside of the container to high vacuum and preserving the foods.

And another aspect of the present invention, a vacuum sealed preservation container comprising a container main body and a lid made of a synthetic resin which is heat resistant and cold resistant and has microwave permeability, wherein the lid has on the upper surface thereof a check valve formed with a heat resistant and cold resistant rubber or rubbery elastomer constituted such that gases in the container flow out only in one direction to the outside of the container through a vent hole, and a packing case disposed in contiguous with the circumferential edge thereof, a packing made of a heat resistant and cold resistant rubber or rubbery elastomer is mounted in the packing case, the check valve is inserted into an opening freely movably, prevented from detaching by a stopper ring from the opening and covers to close the vent hole, the container is constituted such that the lid and the container main body are in airtight contact with each other by way of the packing, the lid is pressed to discharge a portion of gases in the inside through the vent hole below the check valve to the outside thereby reducing the pressure in the inside of the container and the check valve instantly closes the vent hole upon stopping the pressing, and an external air is caused to enter by raising a knob of the check valve when sealing is released.

Further, another aspect of the present invention, a vacuum sealed preservation container having a container main body and a lid made of a synthetic resin which is heat resistant and cold resistant and has a microwave permeability, wherein the lid comprises a check valve made of a heat resistant or cold resistant rubber or rubbery elastomer disposed to the upper surface of the lid such that gases in the container flow out only in one direction to the outside of the container through a vent hole, and a packing case disposed in contiguous with the circumferential edge thereof, a packing made of a heat resistant and cold resistant rubber or rubbery elastomer is mounted in the packing case, the check valve is inserted into an opening and retained while being provided with a slight pulling by a stopper ring such that the circumferential edge is uniformly sealed to the surface of the lid and covers to close the vent hole, the lid and the container main body are brought into airtight contact with each other over the entire circumference by way of the packing and provide sealing by slight engagement by a stopper means, and a knob of the check valve is raised to enter external air when the sealing is released.

According to the present invention, when cooked foods are preserved by a preserving method and a vacuum sealed preservation container, foods can be stored safely and, particularly, if the container is taken out as a lunch box under a sever condition of 30 to 35° C. in the summer season, it does not cause food accidents or the like and provides a significant merit.

Further, according to the present invention, when cooked foods are stored in an ice box or refrigerator by using the vacuum sealed preservation container, the foods can be preserved for a considerable period of time without deteriorating tastes.

In addition, when they are served by re-heating, since they can be heated safely in a vacuum sealed state as they are in a microwave oven and since steam is generated at a low temperature, they function as a heat medium to enable heating in a short period of time.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention. In the drawings.

FIGS. 3(*a*) and (*b*) are cross sectional views for an engaging portion A and an engaging portion B of a vacuum sealed preservation container with a stopper according to the present invention;

FIG. 4 is a cross sectional view of a cylindrical vacuum sealed preservation container according to the present invention;

DETAILED DESCRIPTION OF THE PREFERRED EMBODIMENTS

A detailed description of the preferred embodiment of a method for preserving cooked foods and a vacuum sealed preservation container therefor, embodying the present invention will now be given referring to the accompanying drawings.

Figure 1:
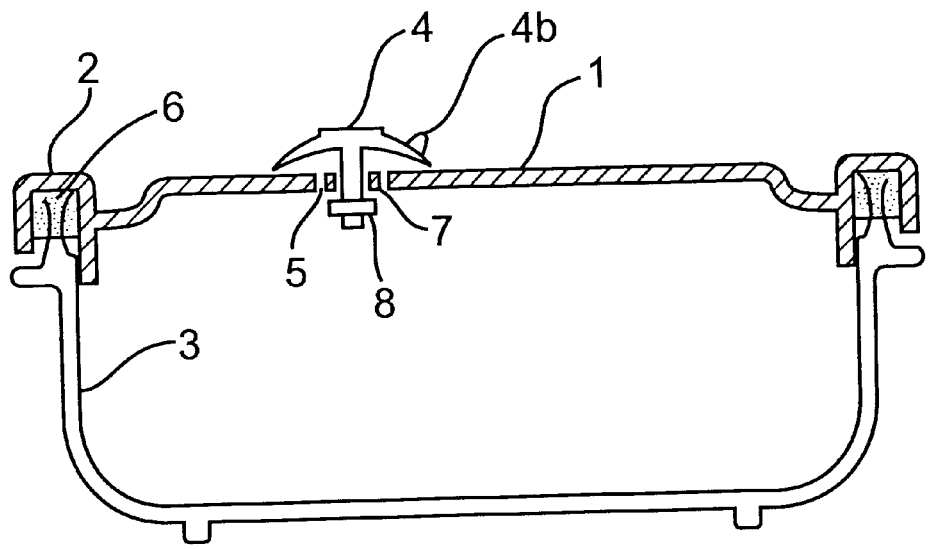
FIG. 1 is a cross sectional view of a vacuum sealed preservation container according to the present invention.

FIG. 1 shows an entire cross sectional view of a preservation container according to a first embodiment of the present invention. The preservation container according to the present invention comprises a container main body 3 and a lid 1 made of a synthetic resin which is heat resistant, cold resistant and has a microwave permeability. The lid 1 has a check valve 4 made of a heat resistant and cold resistant rubber or rubbery elastomer disposed at the upper surface thereof constituted so as to discharge gases in the container only in one direction to the outside of the container through a vent hole 5, and a packing case 2 disposed in contiguous with the circumferential edge thereof. The packing case 2 has a packing 6 made of a heat resistant and cold resistant rubber or rubbery elastomer mounted therein, and the check valve 4 is inserted freely movably from the outside into an opening 7, prevented from detachment from the opening 7 by a stopper ring 8, and closes the vent hole 5, and container is constituted such that the lid 1 and the container main body 3 are in an airtight contact by way of the packing 6.

When cooked foods are placed in the container main body 3, covered with the lid 1 and heated in a microwave oven, for example, from 1 to 2 min, the foods are heated from the inside without deteriorating tastes and the like, by which thermophile and mesophile pathogenic bacteria are sterilized and, at the same time, steam is generated from water content in the foods and from water used for cooking and air in a head space is thermally expanded, so that they are discharged through a portion between the lid 1 and the container main body 3 and through the check valve 4 to the outside of the container to attain deaeration.

After heating for a required time, when the container is taken out of the oven and the lid 1 is pressed two or three times, most of remaining gases are discharged to reduce the pressure in the container, and the check valve closes the vent hole after stopping pressing to instantly seal the container. When they are cooled, since steam in the container is condensed into water, and the concentration of air and thus that of oxygen is also reduced extremely, this can prevent oxidation of foods and attain bacteriostasis for aerobic heat stable spore bacteria.

Accordingly, the cooked foods are put to sterilization and bacteriostasis in the microwave heating in the microwave oven, and the container is intensely sealed to preserve the foods.

The preservation container is different from existent preservation containers in that a check valve is disposed to the upper surface of the lid and has no function as it is as the preservation container. Even when cold foods are charged and tightly sealed by pressing the lid, the degree of pressure reduction is utmost 50 to 70 mmHg and leakage is caused easily by the elevation of atmospheric temperature and lowering of atmospheric pressure. Only when gases in the container are discharged and deaerated by internal heating, tightly sealed under pressure and then cooked to utilize shrinkage of the gases in the container by the temperature lowering as in the present invention, the container is made to be sealed and shielded intensely without leakage for a long period of time. The oxygen concentration in the container can be lowered extremely to prevent oxidation of foods to attain the object of the invention.

Figure 2:
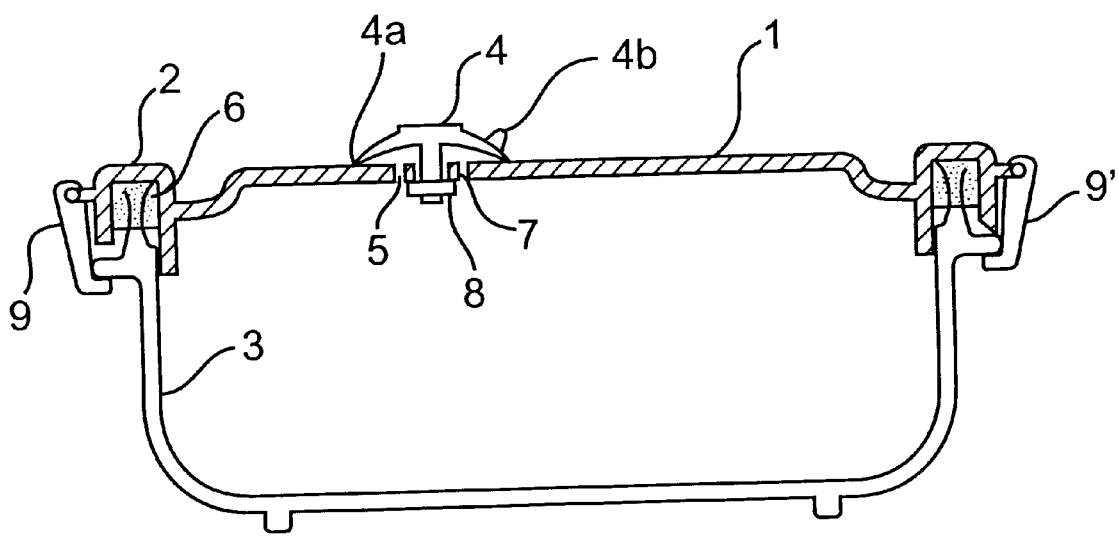
FIG. 2 is a cross sectional view of a vacuum sealed preservation container with a stopper according to the present invention.

FIG. 2 shows an entire cross sectional view of a preservation container according to another embodiment of the present invention. The container comprises a container main body 3 and a lid 1 made of a synthetic resin which is heat resistant and cold resistant and has a microwave permeability. The lid 1 has a check valve 4 made of a heat resistant and cold resistant rubber or rubbery elastomer disposed to the upper surface thereof so as to discharge gases in the container to the outside of the container only in one direction through a vent hole 5, and a packing case 2 disposed in contiguous with the circumferential edge thereof. The packing case 2 has a packing 6 made of a heat resistant and cold resistant rubber or rubbery elastomer mounted therein. The check valve 4 is constituted such that it is inserted from the outside in an opening 7 slightly pulled downward by a stopper ring 8 such that the circumferential edge 4a is uniformly and tightly sealed to the surface of the lid 1 and closes the vent hole 5. The lid 1 and the container main body 3 are in airtight contact with each other by way of the packing 6 and slightly engaged by stoppers 9, 9'. When cooked foods are charged in the container main body 3, tightly closed by the engagement of stoppers 9, 9' and then heated for 1 to 2 min in a microwave oven, the pressure in the container is elevated by generation of steam and expansion of air in the same manner as described previously, by which the gases inside are discharged and deaerated through a portion between the lid 1 and the container main body 3 and through the vent hole 5 below the check valve 4 to the outside, during which the foods are sterilized. Then, when the heating is stopped and the foods are allowed to cool, the container is intensely sealed automatically to attain the object of the present invention.

FIG. 3(*a*), (*b*) are explanatory views showing an engaging relation of stoppers 9, 9' of a container having substantially the same constitution as the container shown in FIG. 2, as another embodiment of the present invention.

In a preservation container in which the lid 1 and the container main body 3 are brought into an airtight contact by way of a packing 6 and engageable slightly with stoppers 9, 9' when the container is heated in a microwave oven and then allowed to cool and tightly sealed, the packing is compressed to release the engaging relation A freely. For preventing this, it is constituted such that an engaging relation A and an engaging relation B in 90° direction thereto are exerted simultaneously.

When heat-cooked foods are charged in the container and heated in a microwave oven and then allowed to cool, the container is sealed automatically. In the container of the constitution shown in FIG. 2, when the pressure inside the container is reduced, the packing is enforced to disengage the relationship A freely for the stoppers 9, 9'. By constituting the stoppers 9, 9' such that the engaging relation A and the engaging relation B are exerted simultaneously to prevent this, even when the engaging relation A is released, the engaging relation B is caused to slide to prevent the freely released state.

Accordingly, when the container is sealed automatically by allowing to cool after microwave oven heating, the stoppers are not disengaged. When the sealing is to be released, this can be attained by detaching the stoppers 9, 9' and raising a knob 4b for the check valve 4 thereby allowing external air to flow into the inside.

FIG. 4 is an entire cross sectional view of a preservation container according to a further embodiment of the present invention. This is a cylindrical container comprising a container main body 3 and a lid 1 made of a synthetic resin which is heat resistant and cold resistant and has a microwave permeability. The lid 1 comprises a check valve 4 made of a heat resistant and cold resistant rubber or rubbery elastomer disposed to the upper surface thereof so as to allow gases in the container to flow to the outside of the container only in one direction through the vent hole 5 and a packing case 2 disposed in contiguous with the circumferential edge thereof. An O-ring shaped packaging 6 made of heat resistant and cold resistant rubber or rubbery elastomer is mounted in the packing case. The check valve 4 is inserted from the outside and slightly pulled by a stopper ring 8 such that the circumferential edge 4a uniformly seals the surface of the lid 1 and closes the vent hole 5. The lid 1 and the container main body 3 can be screw-coupled and sealed with each other.

After filling the cooked foods in the container main body 3 and sealed by screw-coupling, when they are heated for 1 to 2 min in a microwave oven, pressure inside the container is raised by the generation of steam and expansion of air in the same manner as described previously, gases in the inside are discharged and deaerated to the outside through the vent hole 5 below the check valve 4, during which the foods are sterilized. Then, if heating is stopped and the container is allowed to cool, the container is tightly sealed automatically to attain the purpose of the present invention. The sealing can be released by raising a knob 4b of the check valve allowing external air to flow into the inside and then releasing screw-coupling between the lid 1 and the container main body 3.

Figure 5:
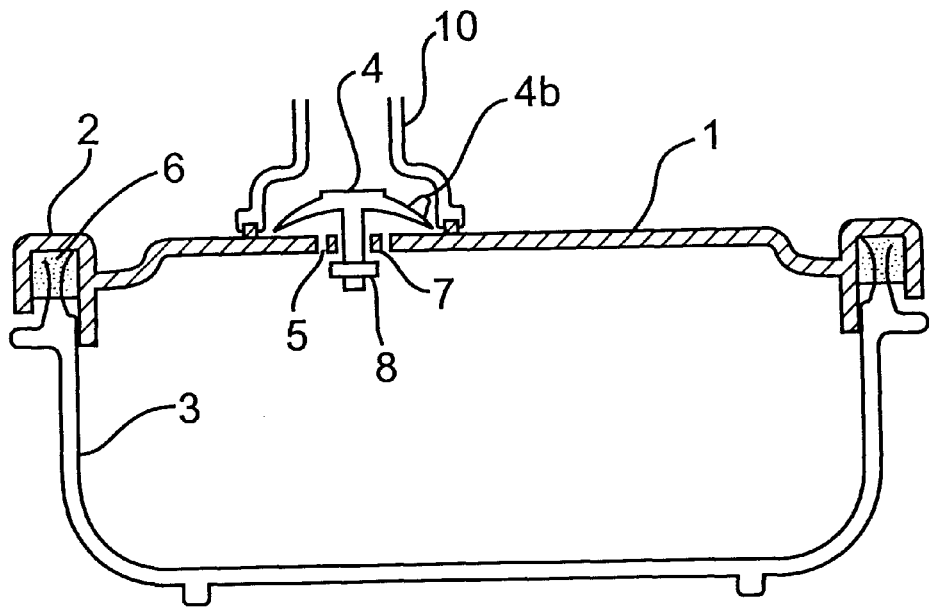
FIG. 5 is a cross sectional view of a vacuum sealed preservation container according to the present invention using a vacuum pump.
Figure 6:
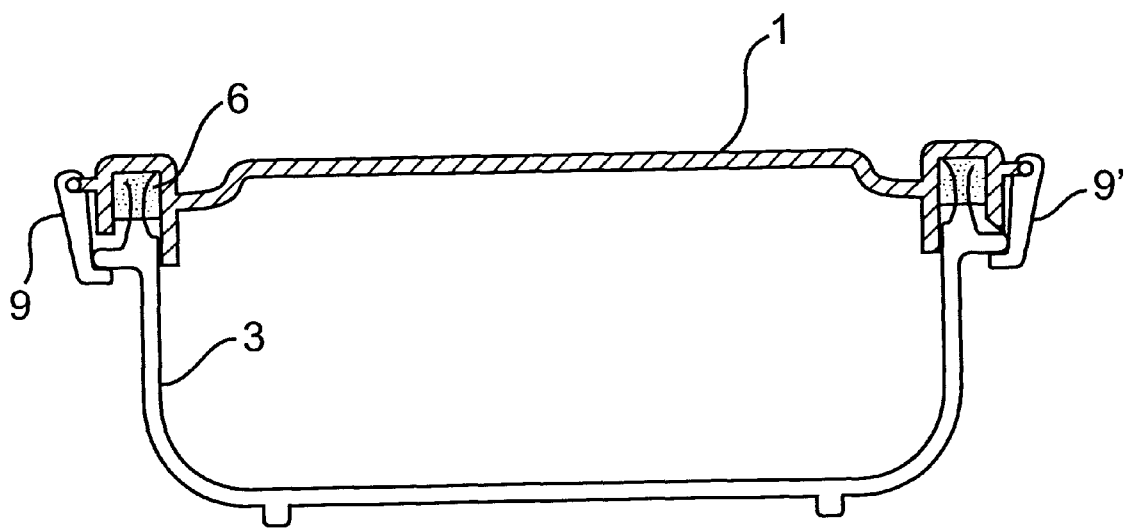
FIG. 6 is a cross sectional view of a preservation container of the prior art.
Figure 7:
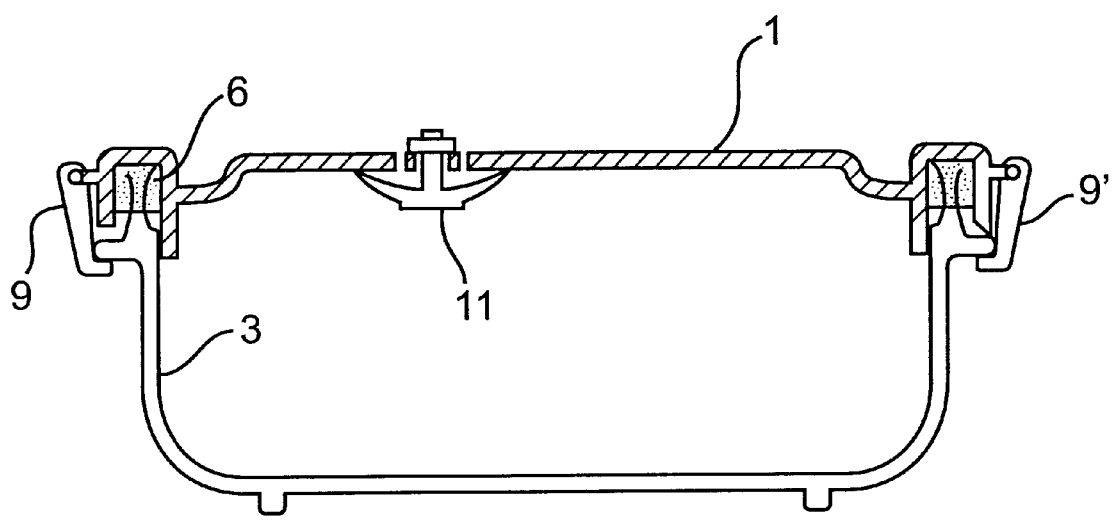
FIG. 7 is a cross sectional view of a preservation container with a pressure control valve in the prior art.

FIG. 5 shows a further embodiment of the present invention in which the container is constituted like that in FIG. 1. The lid and the container main body are brought into airtight contact with each other by way of a packing, a suction portion 10 of a vacuum pump is capped over the check valve and sealing can be obtained by suction from the vacuum pump. Since the container is sealed by the same operation as sealing for the lid by pressing, the foods can be heat sterilized and stored in the same manner.

The present invention will be explained more in details by way of examples.

EXAMPLE 1

It was assumed for such a case of preserving foods in a lunch box prepared in the afternoon of the preceding day in a refrigerator (5° C.) for 16 hours and then bringing it out in the next morning and serving after elapse of six hours. Assuming a case that the foods were initially contaminated by typical three kinds of pathogenic bacteria causing food poisoning, bacteria solutions previously prepared were inoculated individually and, for examining the change of state, a test was asked to Nippon Food Analysis Center (Foundation Juridical Person) (Nagoya branch, 6–13, Ohsu 4-chome, Naka-ku, Nagoya-shi) using a vacuum sealed preservation container (shown in FIG. 1) of the present invention as a specimen.

In this case, the test was conducted by selecting boiled rice which is always present in lunch boxes since use of various kinds of daily dishes may lack in exactness.

Test for enteritis vibrio was not conducted since they are halophilie bacteria growing on perishable foods such as fishes and shells and growing well in aqueous 3 to 4% solutions of sodium chloride and do not grow in boiled rice.

Results of the preservation test are as shown in a test report dated on Feb. 17, 1997 (Hei-9) prepared by the Japan Food Analysis Center (Foundation Juridical Person). They are shown below.

Note

Test Report No. NA397010362
Requested by Hikari Kinzoku Industry Co., LTD.
Specimen Vacuum sealed preservation container
Test Item Preservation test
Test Results for the specimens submitted to this center dated on Jan. 17, 1997 (Hei-9) areas follows.

Preservation Test
1. Purpose of Test:
   Boiled rice filled in the specimen is treated in a microwave oven and a preservation test is conducted.
2. Outline of the Test:
   After inoculating *Escherichia coli., Staphylococcus aureus* and *Salmonella enteritidis* respectively to boiled rice filled in the specimens and treating it for 1.5 min in a microwave oven, each specimen was sealed by pushing a central portion of a lid for 2 to 3 times. Then, they were stored in a refrigerator for 16 hours and then stored at a room temperature for 6 hours. Then, each number of living cells just after the inoculation of the bacteria solutions, after treatment in the microwave oven and after preservation in the refrigerator and after room temperature preservation is measured. The test was tried each for twice in parallel measurement.
3. Test Result:
   The results are shown in Table-1.

TABLE 1

Result of Preservation Test

| Test Bacteria | Measurement | Number of living cells per 1 g of boiled rice | |
| --- | --- | --- | --- |
| *Escherichia coli* | Just after inoculation of bacteria solution | $1.3 \times 10^5$ | $1.6 \times 10^5$ |
| | After 1.5 min treatment by microwave oven | <100 | <100 |
| | After preservation for 16 hr in refrigerator | <100 | <100 |
| | After 6 hour preservation at room temperature | <100 | <100 |
| *Staphylococcus aureus* | Just after inoculation of bacteria solution | $2.5 \times 10^5$ | $1.1 \times 10^5$ |
| | After 1.5 min treatment by microwave oven | <100 | <100 |
| | After preservation for 16 hr in refrigerator | <100 | <100 |
| | After 6 hours preservation at room temperature | <100 | <100 |
| *Salmonella* | Just after inoculation of enteritidis bacteria solution | $2.5 \times 10^5$ | $1.3 \times 10^5$ |
| | After 1.5 min treatment by microwave oven | <100 | <100 |
| | After preservation for 16 hr in refrigerator | <100 | <100 |
| | After 6 hours preservation at room temperature | <100 | <100 |

<100: not detected

4. Test method
1) Test bacteria strain
   *Escherichia coli* IFO 3972
   *Staphylococcus aureus* IFO 12732
   *Salmomella enteritidis* IFO 3313
2) Test Culture Medium
   NA culture medium: usual agar culture medium (Eiken Kagaku Co.)
   DHL culture medium: DHL agar culture medium (Eiken Kagaku Co.)
   EY culture medium: Egg yoke brine agar culture medium (Eiken Kagaku Co.)
3) Preparation of a bacteria solution
   Test bacteria strains cultured in NA culture medium at 37±1° C. for 16 to 24 hr were inoculated again in NA culture medium and cultured at 37±1° C. for 16 to 20 hr, which were homogeneously dispersed in a physiological saline and prepared to contain approximately $10^7$ of bacteria cells per 1 ml.
4) Test operation:
   160 g of boiled rice cooled down to a room temperature after cooking was filled in each of two test specimens. 1.6 ml of the bacteria solution was inoculated to each of them and mixed thoroughly. After treating them in a microwave oven (oscillation frequency: 2,450 MHz, power: 500 W) for 1.5 min, the container was tightly sealed by pushing a central portion of a lid for two to three times. Then, after preserving in a refrigerator for 16 hr, they were stored at a room temperature for 6 hr.

5) Measurement for the number of living cells

① *Escherichia coli* and *Salmonella enteritidis*

The number of living cells in the boiled rice was measured just after inoculation of bacteria solutions, after treating in the microwave oven, after preservation in the refrigerator and after preservation at room temperature, by a plate coating culturation method using DHL culture medium (cultured at 37° C. for one day) and they were converted as a number per 1 g of boiled rice.

② *Staphylococcus aureus*

The number of living cells in the boiled rice was measured just after inoculation of bacteria solutions, after treating in the microwave oven, after preservation in the refrigerator, and after preservation at a room temperature by a plate coating culturation method using EY culture medium (cultured at 37° C. for two days) and they were converted as the number per 1 g of boiled rice.

EXAMPLE 2

It was assumed for such a case of preserving boiled rice cooled to a room temperature after cooking at 30° C.±1° C. for 24 hours and then serving the same. Assuming a case that the foods were initially contaminated by typical three kinds of pathogenic bacteria causing food poisoning, bacteria solutions previously prepared were inoculated individually and, for examining the change of state, a test was asked to Nippon Food Analysis Center (Foundation Juridical Person) (Nagoya branch, 6–13, Ohsu 4-chome, Naka-ku, Nagoya-shi) using a vacuum sealed preservation container (shown in FIG. 1) of the present invention as a specimen.

Test for enteritis vibrio was not conducted since they are halophilie bacteria growing on perishable foods such as fish and shells and growing well in aqueous 3 to 4% solutions of sodium chloride and do not grow in boiled rice.

Results of the preservation test are as shown in a test report dated on May 8, 1997 (Hei-9) prepared by the Japan Food Analysis Center (Foundation Juridical Person). They are shown below.

Note

Test Report No. NA39730292-1
Requested by Hikari Kinzoku Industry Co., LTD.
Specimen Vacuum sealed preservation container
Test Item Preservation test
Test Results for the specimens submitted to this center dated on Jan. 22, 1997 (Hei-9) areas follows.

Preservation Test

1 Purpose of Test:

Boiled rice filled in the specimen is treated in a microwave oven and a preservation test is conducted.

2. Outline of the Test:

After inoculating *Escherichia coli., Staphylococcus aureus* and *Salmonella enteritidis* respectively to boiled rice filled in the specimens and treating it for 1.5 min in a microwave oven, each specimen was sealed by pushing a central portion of a lid for 2 to 3 times. Then, they were stored at 30° C.±1° C. for 24 hours. Then, each number of living cells just after the inoculation of the bacteria solutions and after treatment in the microwave oven and after preservation at 30° C. is measured. The test was tried each for twice in parallel measurement.

3. Test Results:

The results are shown in Table-2.

TABLE-2

Result of Preservation Test

| Test Bacteria | Measurement | Number of living cells per 1 g of boiled rice | |
| --- | --- | --- | --- |
| *Escherichia coli* | Just after inoculation of bacteria solution | $3.2 \times 10^5$ | $4.4 \times 10^5$ |
| | After 1.5 min treatment by microwave oven | <100 | <100 |
| | After preservation at 30° C. for 24 hr | <100 | <100 |
| *Staphylococcus aureus* | Just after inoculation of bacteria solution | $2.6 \times 10^5$ | $3.9 \times 10^5$ |
| | After 1.5 min treatment by microwave oven | <100 | <100 |
| | After preservation at 30° C. for 24 hr | <100 | <100 |
| *Escherichia* | Just after inoculation of microwave oven | $3.2 \times 10^5$ | 4.4x105 |
| | | <100 | <100 |
| | After preservation at 30° C. for 24 hr | <100 | <100 |
| *Salmonella* | Just after inoculation of enteritidis bacteria solution | $1.9 \times 10^5$ | $3.3 \times 10^5$ |
| | After 1.5 min treatment by microwave oven | <100 | <100 |
| | After preservation at 30 C° for 24 hr | <100 | <100 |

<100: not detected

4. Test method

1) Test bacteria strain

*Escherichia coli* IFO 3972

*Staphylococcus aureus* IFO 12732

*Salmomella enteritidis* IFO 3313

2) Test Culture Medium

NA culture medium: usual agar culture medium (Eiken Kagaku Co.)

DHL culture medium: DHL agar culture medium (Eiken Kagaku Co.)

EY culture medium: Egg yoke brine agar culture medium (Eiken Kagaku Co.)

3) Preparation of a bacteria solution

Test bacteria strains cultured in NA culture medium at 37±1° C. for 16 to 24 hr were inoculated again in NA culture medium and cultured at 37±1° C. for 16 to 20 hr, which were homogeneously dispersed in a physiological saline and prepared to contain approximately $10^7$ of bacteria cells per 1 ml.

4) Test operation:

160 g of boiled rice cooled down to a room temperature after cooking was filled in each of two test specimens. 1.6 ml of the bacteria solution was inoculated to each of them and mixed thoroughly. After treating them in a microwave oven (oscillation frequency: 2,450 MHz, power: 500 W) for 1.5 min, the container was tightly sealed by pushing a central portion of a lid for two to three times, and they were stored at 30° C.±1° C. for 24 hr.

5) Measurement for the number of living cells

① *Escherichia coli* and *Salmonella enteritidis*

The number of living cells in the boiled rice was measured just after inoculation of bacteria solutions and after treating in the microwave oven, and after preservation at 30° C. by a plate coating culturation method using DHL culture medium (cultured at 37° C. for one day) and they were converted as a number per 1 g of boiled rice.

② *Staphylococcus aureus*

The number of living cells in the boiled rice was measured just after inoculation of bacteria solutions, after treating in the microwave oven, and after preservation at 30° C. by a plate coating culturation method using EY culture medium (cultured at 37° C. for two days) and they were converted as the number per 1 g of boiled rice.

EXAMPLE 3

It was assumed for such a case of preserving boiled rice cooled to a room temperature after cooking at 5° C.±1° C. for 5 days and then serving the same. Assuming a case that the foods were initially contaminated by typical three kinds of pathogenic bacteria causing food poisoning, bacteria solutions previously prepared were inoculated individually and, for examining the change of state, test was asked to Nippon Food Analysis Center (Foundation Juridical Person) (Nagoya branch, 6–13, Ohsu 4-chome, Naka-ku, Nagoya-shi) using a vacuum sealed preservation container (shown in FIG. 1) of the present invention as a specimen.

Test for enteritis vibrio was not conducted since they are halophilie bacteria growing on perishable foods such as fishes and shells and growing well in aqueous 3 to 4% solutions of sodium chloride and do not grow in boiled rice.

Results of the preservation test are as shown in a test report dated on May 8, 1997 (Hei-9) prepared by the Japan Food Analysis Center (Foundation Juridical Person). They are shown below.

Note

Test Report No. NA39730292-2
Requested by Hikari Kinzoku Industry Co., LTD.
Specimen Vacuum sealed preservation container
Test Item Preservation test
Test Results for the specimens submitted to this center dated on Jan. 22, 1997 (Hei-9) areas follows.

Preservation Test

1. Purpose of Test:
   Boiled rice filled in the specimen is treated in a microwave oven and a preservation test is conducted.
2. Outline of the Test:
   After inoculating *Escherichia coli.*, *Staphylococcus aureus* and *Salmonella enteritidis* respectively to boiled rice filled in the specimens and treating it for 1.5 min in a microwave oven, each specimen was sealed by pushing a central portion of a lid for 2 to 3 times. Then, they were stored at 5° C.±1° C. for 5 days. Then, each number of living cells just after the inoculation of the bacteria solutions, after treatment in the microwave oven and after preservation at 5° C. for 5 days is measured. The test was tried each for twice in parallel measurement.
3. Test Results:
   The results are shown in Table-3.

TABLE-3

Result of preservation Test

| Test Bacteria | Measurement | Number of living cells per 1 g of boiled rice | |
|---|---|---|---|
| *Escherichia coli* | Just after inoculation of bacteria solution | $4.3 \times 10^5$ | $5.1 \times 10^5$ |
| | After 1.5 min treatment by microwave oven | <100 | <100 |

TABLE-3-continued

Result of preservation Test

| Test Bacteria | Measurement | Number of living cells per 1 g of boiled rice | |
|---|---|---|---|
| | After preservation at 5° C. for 5 days | <100 | <100 |
| *Staphylococcus aureus* | Just after inoculation of bacteria solution | $6.9 \times 10^5$ | $4.0 \times 10^5$ |
| | After 1.5 min treatment by microwaveoven | <100 | <100 |
| | After preservation at 5° C. for 5 days | <100 | <100 |
| *Salmonella* | Just after inoculation of enteritidis bacteria solution | $2.6 \times 10^5$ | $2.5 \times 10^5$ |
| | After 1.5 min treatment by microwave oven | <100 | <100 |
| | After preservation at 5° C. for 5 days | <100 | <100 |

<100: not detected

4. Test method
1) Test bacteria strain
   *Escherichia coli* IFO 3972
   *Staphylococcus aureus* IFO 12732
   *Salmomella enteritidis* IFO 3313
2) Test Culture Medium
   NA culture medium: usual agar culture medium (Eiken Kagaku Co.)
   DHL culture medium: DHL agar culture medium (Eiken Kagaku Co.)
   EY culture medium: Egg yoke brine agar culture medium (Eiken Kagaku Co.)
3) Preparation of a bacteria solution
   Test bacteria strains cultured in NA culture medium at 37±1° C. for 16 to 24 hr were inoculated again in NA culture medium and cultured at 37±1° C. for 16 to 20 hr, which were homogeneously dispersed in a physiological saline and prepared to contain approximately 10 of bacteria cells per 1 ml.
4) Test operation:
   160 g of boiled rice cooled down to a room temperature after cooking was filled in each of two test specimens. 1.6 ml of the bacteria solution was inoculated to each of them and mixed thoroughly. After treating them in a microwave oven (oscillation frequency: 2,450 MHz, power: 500 W) for 1.5min, the container was tightly sealed by pushing a central portion of a lid for two to three times, and they were stored at 5° C.±1° C. for 5 days.
5) Measurement for the number of living cells
   ① *Escherichia coli* and *Salmonella enteritidis*
   The number of living cells in the boiled rice was measured just after inoculation of bacteria solutions, after treating in the microwave oven, and after preservation at 5° C. by a plate coating culturation method using DHL culture medium (cultured at 37° C. for one day) and they were converted as a number per 1 g of boiled rice.
   ② *Staphylococcus aureus*
   The number of living cells in the boiled rice was measured just after inoculation of bacteria solutions, after treating in the microwave oven, and after preservation at 5° C. by a plate coating culturation method using EY culture medium (cultured at 37° C. for two days) and they were converted as the number per 1 g of boiled rice.

EXAMPLE 4

Enterohemorrhagic *Escherichia coli* O157 and its toxin are sensitive to heat and are killed if heated at 75° C. for 1 min at a central portion.

In hamburgers and the like, if heat does not prevail sufficiently throughout the inside, food poisoning may possibly occur by the bacteria. In the cases of food poisoning caused by Enterohemorrhagic *Escherichia coli* O157 in the U.S.A., they were often caused by minced meat products with insufficient heating. Since the bacteria have intense infectiosity, it is said that they onset diseases only by 100 cells (Why Food Poisoning Occurs Frequently, teaching from pathogenic *Escherichia coli* O157 cases, written by Katsutoshi Miura in National Hygiene Research Institute, Published from Nippon Tosho Kankokai).

Then, hamburgers made by using 100 g of beef minced meat per one piece (stored cold at 5° C) were brought into Japan Food Analysis Center (Foundation Juridical Person) (Nagoya Branch, 6–13, Ohsu 4-chome, Naka-ku, Nagoya-shi) and a test, by inoculation of previously prepared bacteria solutions using the vacuum sealed preservation container (shown in FIG. 1) of the present invention as a specimen, was requested.

In the test, for avoiding a possible risk of secondary contamination vellogenic toxin not producing strain of pathogenic *Escherichia coli* O157: H7 was used. The conditions for heat sterilization is considered unchanged.

Results of the preservation test are as shown in a test report dated on Jan. 16, 1998 (Hei-10) prepared by the Japan Food Analysis Center (Foundation Juridical Person). They are shown below.

Note

Test Report No. 397110319-003

Requested by Hikari Kinzoku Industry Co., LTD.

Specimen Vacuum sealed preservation container

Test Item Preservation test

Test Results for the specimens submitted to this center dated on Nov. 18, 1997 (Hei-9) are as follows.

Preservation Test

1. Purpose of Test:

Hamburgers inoculated with bacterial solutions of *Escherichia coli* (O157: H7) filled in the specimen (provided by the requester) are treated in a microwave oven to conduct a preservation test.

2. Outline of the Test:

Hamburgers inoculated with bacteria solutions of *Escherichia coli* (O157: H7) were filled in specimens and treated for 2 min in a microwave oven. Then, after tightly sealing the container by pressing a central portion of the lid of the specimen for 2 to 3 times, they were preserved at 30±1° C. for 24 hours and the number of living cells was measured.

Test was tried for twice in parallel measurement.

3. Test Results:

The results are shown in Table-4.

TABLE-4

Result of Preservation Test

| Test Bacteria | Measurement | Number of living cells per 1 g of boiled rice | |
|---|---|---|---|
| *Escherichia coli* (O157:H7) | Just after inoculation of bacteria solution | $1.3 \times 10^6$ | $1.8 \times 10^6$ |
| | After 2 min treatment by microwave oven | <10 | <10 |
| | After preservation at 30° C. for 24 hr | <10 | <10 |

<10: not detected

4. Test methods

1) Test bacteria strain

*Escherichia coli* ATCC 43888 (*Escherichia coli* O157:H7)

2) Test Culture Medium

NA culture medium: usual agar culture medium (Eiken Kagaku Co.)

DA culture medium: Desoxycholate culture medium (Eiken Kagaku Co.)

3) Preparation of bacteria solution

Test bacteria strain cultured in NA culture medium at 37±1° C. for 16 to 24 hr were inoculated again in NA culture medium and cultured at 37±1° C. for 16 to 20 hr which were homogeneously dispersed in a physiological saline and prepared to contain approximately $10^7$ of bacteria cells per 1 ml.

4) Test operation:

One piece of hamburgers (products provided by the requester: approximately 65 to 70 g weight, approximately 6 cm diameter, approximately 2 cm thickness) stored in a refrigerator (5° C.) was filled in the test specimens. 0.7 ml of the bacteria solution was inoculated which was treated in a microwave oven (oscillation frequency: 2,450 MHz, power: 500 W) for 2 min. Then, the container was tightly sealed by pushing a central portion of a lid for two to three times. Then, they were preserved at 30±1° C. for 24 hr.

5) Measurement for the number of living bacteria

The number of living cells was measured just after inoculation of bacteria solutions, after treating in the microwave oven and after preservation at 30° C. for 24 hr and they were converted per 1 g of hamburgers.

EXAMPLE 5

A solution of *Escherichia coli* (O157: H7) was inoculated to home made hamburgers which were heat-treated by an electronic microwave oven and stored in a refrigerator (5° C.) for 5 days in vacuum sealed preservation containers. For examining the results, they were brought into Japan Food Analysis Center (Foundation Juridical Person) (Nagoya Branch, 6–13, Ohsu 4-chome, Naka-ku, Nagoya-shi) and a test, by inoculation of previously prepared bacteria solutions using the vacuum sealed preservation container (shown in FIG. 1) of the present invention as a specimen, was requested.

Results of the preservation test are as shown in a test report dated on Jan. 16, 1998 (Hei-10) prepared by the Japan Food Analysis Center (Foundation Juridical Person). They are shown below.

Note

Test Report No. 397110319-004
Requested by Hikari Kinzoku Industy Co., LTD.
Specimen Vacuum sealed preservation container
Test Item Preservation test
Test Results for the specimens submitted to this center dated on Nov. 18, 1997 (Hei-9) are as follows.

Preservation Test

1. Purpose of Test:

Hamburgers inoculated with bacterial solutions of *Escherichia coli* (O157: H7) filled in the specimen (provided by the requester) are treated in a microwave oven to conduct a preservation test.

2. Outline of the Test:

Hamburgers inoculated with bacteria solutions of *Escherichia coli* (O157: H7) were filled in specimens and treated for 2 min in a microwave oven. Then, after tightly sealing the container by pressing a central portion of the lid of the specimen for 2 to 3 times, they were preserved at 5±1° C. for 24 hours and the number of living cells was measured.

Test was tried for twice in parallel measurement.

3. Test Results:

The results are shown in Table-5.

TABLE-5

Result of Preservation Test

| Test Bacteria | Measurement | Number of living cells per 1 g of boiled rice | |
| --- | --- | --- | --- |
| *Escherichia coli* (O157:H7) | Just after inoculation of bacteria solution | $1.3 \times 10^6$ | $1.8 \times 10^6$ |
| | After 2 min treatment by microwave oven | <10 | <10 |
| | After preservation at 5° C. for 5 days | <10 | <10 |

<10: not detected

4. Test methods

1) Test bacteria strain

*Escherichia coli* ATCC 43888 (*Escherichia coli* O157:H7)

2) Test Culture Medium

NA culture medium: usual agar culture medium (Eiken Kagaku Co.)

DA culture medium: Desoxycholate culture medium (Eiken Kagaku Co.)

3) Preparation of a bacteria solution

Test bacteria strain cultured in NA culture medium at 37±1° C. for 16 to 24 hr were inoculated again in NA culture medium and cultured at 37±1° C. for 16 to 20 hr which were homogeneously dispersed in a physiological saline and prepared to contain approximately $10^7$ of bacteria cells per 1 ml.

4) Test operation:

One piece of hamburgers (products provided by the requester: approximately 65 to 70 g in weight, approximately 2 cm in thickness) stored in a refrigerator (5° C.) was filled in the test specimens. 0.7 ml of the bacteria solution was inoculated which was treated in a microwave oven (oscillation frequency: 2,450 MHz, power: 500 W) for 2 min. Then, the container was tightly sealed by pushing a central portion of a lid for two to three times. Then, they were preserved at 5±1° C. for 5 days.

The test was tried for twice in parallel measurement.

5) Measurement for the number of living bacteria

The number of living cells in the hamburgers was measured just after inoculation of bacteria solutions, after treating them in the microwave oven for 2 min, and after preservation at 5° C. for 5 days by a plate coating calculation method using DA culture medium (cultured at 5° C. for 24 hours) and they were converted as a number per 1 g hamburger.

The present invention may be embodied in other specific forms without departing from the spirit or essential characteristics thereof. For instance, instead of releasing the sealing for the inside of the vacuum sealed preservation container by raising the knob disposed on the check valve, a valve for releasing the sealing may be disposed independently to the main body or the lid.

The foregoing description of the preferred embodiments of the invention has been presented for purposes of illustration and description. It is not intended to be exhaustive or to limit the invention to the precise form disclosed, and modifications and variations are possible in the light of the above teachings or may be acquired from practice of the invention. The embodiments chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method for preserving cooked foods comprising:

a filling step for filling cooked foods in a preservation container;

a covering step for covering a lid having a check valve enabling to discharge gases in the preservation container over the preservation container filled with the cooked foods in the filling step;

a heating step for heating by microwaves the cooked foods in the preservation container covered with the lid by the covering step;

a sealing step for discharging air in the preservation container for the cooked foods heated by the heating step by way of said check valve thereby sealing under a reduced pressure the inside of the preservation container; and a cooling step for cooling the cooked foods in the preservation container sealed under a reduced pressure by the sealing step.

2. A preservation method according to claim 1, wherein said cooked foods are heated-cooked foods previously cooked by heating.

3. A preservation method according to claim 2, wherein the heat-cooked foods are boiled rice.

4. A preservation method according to claim 2, wherein said heat-cooked foods are hamburgers.

5. A preservation method according to claim 2, wherein said heat-cooked foods are composed of two or more kinds of foods having a difference in the time elapsed after the heat cooking.

6. A preservation method according to claim 1, wherein said heat-cooked foods contain non-heat-cooked foods which are not yet cooked by heating.

7. A preservation method according to claim 6, wherein said non-heat-cooked foods are perishable foods.

8. A method for preserving cooked foods comprising:

a step for filling cooked foods in a container main body of a vacuum preservation container having a container main body and a lid disposed on the upper surface thereof and having a check valve, in which packing is mounted in a packing case disposed in contiguous with the circumferential edge of the lid;

a step for heating foods for a predetermined period of time with the lid being covered in a microwave oven, thereby rapidly heating said foods from the inside and sterilizing them and, at the same time, rapidly discharging water contents of the foods, steam generated from a cooking water content, and air in a gap in the upper portion of the container which is heated and expanded to the outside, through a portion between the lid and the container main body and through a vent hole below the check valve;

a step for rapidly taking out the container immediately after said completion of the heating by an electronic microwave oven and then sealing the same; and a step for further increasing the sealing force of the container by cooling the container and the foods contained thereby rendering the inside of the container to high vacuum and preserving the foods.

9. A preservation method according to claim 8, wherein a suction portion of a vacuum pump is capped over said check valve to tightly seal the container by sucking, and, on the other hand, a knob of the check valve is raised to flow external air into the inside upon releasing the sealing.

* * * * *

UNITED STATES PATENT AND TRADEMARK OFFICE
CERTIFICATE OF CORRECTION

PATENT NO. : 5,974,686
DATED : November 2, 1999
INVENTOR(S) : Minoru Nomura et al.

It is certified that error appears in the above-identified patent and that said Letters Patent is hereby corrected as shown below:

<u>Title page,</u>
Item [56], References Cited, FOREIGN PATENT DOCUMENTS, please add the following:
-- 9-77145    03/25/97    Japan
3-78780    08/09/91    Japan --

Signed and Sealed this

Sixteenth Day of April, 2002

*Attest:*

JAMES E. ROGAN
*Attesting Officer*    *Director of the United States Patent and Trademark Office*